(12) United States Patent
Kamemoto et al.

(10) Patent No.: US 12,397,627 B2
(45) Date of Patent: Aug. 26, 2025

(54) VEHICLE BATTERY PROTECTION STRUCTURE

(71) Applicant: Mazda Motor Corporation, Hiroshima (JP)

(72) Inventors: Eiji Kamemoto, Hiroshima (JP); Takehiro Kamei, Hiroshima (JP); Taiki Yotsuyanagi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 371 days.

(21) Appl. No.: 18/110,375

(22) Filed: Feb. 16, 2023

(65) Prior Publication Data

US 2023/0264563 A1    Aug. 24, 2023

(30) Foreign Application Priority Data

Feb. 24, 2022 (JP) ................. 2022-026784

(51) Int. Cl.
*B60K 1/04* (2019.01)
*B62D 21/15* (2006.01)
*B62D 25/20* (2006.01)

(52) U.S. Cl.
CPC .............. *B60K 1/04* (2013.01); *B62D 21/157* (2013.01); *B62D 25/20* (2013.01); *B60K 2001/0438* (2013.01)

(58) Field of Classification Search
CPC .............. B60K 1/04; B60K 2001/0438; B62D 21/157; B62D 25/08; B60L 50/66; B60L 50/64; B60Y 2306/01
See application file for complete search history.

(56) References Cited

U.S. PATENT DOCUMENTS

| 10,464,406 | B2 | 11/2019 | Kawabe et al. |
| 10,589,790 | B2 | 3/2020 | Ayukawa |
| 11,040,608 | B2 * | 6/2021 | Lange ................ B62D 25/2027 |
| 12,103,376 | B2 | 10/2024 | Satou et al. |
| 2017/0001667 | A1 | 1/2017 | Ashraf et al. |
| 2020/0130495 | A1 | 4/2020 | Shimizu |

FOREIGN PATENT DOCUMENTS

| FR | 2972169 A1 | 9/2012 |
| JP | 5708567 B2 | 4/2015 |
| WO | 2020/105283 A1 | 5/2020 |

OTHER PUBLICATIONS

Extended European search report issued on Jun. 26, 2023, in corresponding European patent Application No. 23157181.1, 8 pages.
Japanese Office Action issued Jan. 21, 2025 in corresponding Japanese Patent Application No. 2022-026784, 6 pages.

* cited by examiner

*Primary Examiner* — Jason D Shanske
*Assistant Examiner* — James J Triggs
(74) *Attorney, Agent, or Firm* — XSENSUS LLP

(57) ABSTRACT

A vehicle-body structure improves mounting rigidity of a battery protection frame and rigidity of the battery protection frame itself by including a battery protection frame which has a hollow cross-section, a vehicle-body-side frame which extends along the battery protection frame and is coupled with the battery protection frame, and a fixation member which is inserted through a hole portion of the battery protection frame and is capable of fixing the battery protection frame to a vehicle body component as another component than the vehicle-body-side frame in an internal portion of the battery protection frame.

8 Claims, 10 Drawing Sheets

VEHICLE BATTERY PROTECTION STRUCTURE

CROSS-REFERENCE TO RELATED APPLICATION

The present application claims priority to Japanese application number 2022-026784 filed in the Japanese Patent Office on Feb. 24, 2022, the entire contents of which are incorporated herein by reference.

FIELD

The present disclosure relates to a vehicle-body structure for an electric vehicle, for example.

DESCRIPTION OF THE RELATED ART

For example, Patent Literature 1 discloses a vehicle in which batteries are installed below a floor panel. In Patent Literature 1, the vehicle includes an annular vehicle-body bottom skeletal frame which is formed along an outer periphery of the floor panel and an annular battery installation frame which is fixed to the vehicle-body bottom skeletal frame, and the batteries are arranged on the inside of the battery installation frame. The battery installation frame is provided with a mounting upper wall and a mounting lower wall so as to form a flange which is protruded outward, and those mounting upper wall and mounting lower wall are arranged on a lower surface of the vehicle-body bottom skeletal frame and are fastened thereto by bolts.

CITATION LIST

Patent Literature

[Patent Literature 1] International Publication No. WO 2020/105283

SUMMARY

Problems to be Solved

Incidentally, in a case of an electric vehicle, because an installed amount of batteries for supplying electric power to a traveling motor directly influences a cruisable distance, it is demanded that the installed amount of the batteries be increased as much as possible. In this regard, in Patent Literature 1, because a mounting upper wall and a mounting lower wall which are protruded outward from a battery installation frame are arranged on and fastened to a lower surface a vehicle-body bottom skeletal frame, an installation space for the batteries has to be made narrower by spaces for protruded parts of the mounting upper wall and the mounting lower wall.

Accordingly, it is possible that the mounting upper wall and the mounting lower wall in Patent Literature 1 are omitted and the battery installation frame is thereby directly fastened to a vehicle body. Consequently, it becomes possible to increase the installed amount by enlarging the installation space for the batteries by the spaces for the omitted mounting upper wall and mounting lower wall.

However, when the mounting upper wall and the mounting lower wall become absent, how to secure mounting rigidity of the battery installation frame on the vehicle body becomes a problem, and battery protection performance might become insufficient due to lowering of rigidity of the battery installation frame itself.

The present disclosure has been made in consideration of such problems, and one of the objects thereof is to enhance mounting rigidity of a battery protection frame on a vehicle body and to enhance rigidity of the battery protection frame itself as well.

Solutions to the Problems

A first aspect of the present disclosure can be based on a vehicle-body structure for an electric vehicle which includes a traveling motor and in which a battery supplying electric power to the traveling motor is disposed below a floor panel. The vehicle-body structure includes: a battery protection frame that protects the battery and has a hollow cross-section; a vehicle-body-side frame that extends toward the battery protection frame and is coupled with the battery protection frame; and a fixation member that is inserted into a space of an internal portion of the battery protection frame through a hole portion opening in an outer surface of the battery protection frame and connected with the space, and that is capable of fixing the battery protection frame to a vehicle body component as another component than the vehicle-body-side frame in the internal portion of the battery protection frame.

With this configuration, because the battery protection frame has the hollow cross-section, the battery protection frame is provided which is highly rigid and light. Further, because the vehicle-body-side frame that extends along the battery protection frame is coupled with the battery protection frame, this also enhances rigidity of the battery protection frame.

Furthermore, because the battery protection frame is, in its internal portion, fixed to the vehicle body component by the fixation member separately from the vehicle-body-side frame, a mounting upper wall and a mounting lower wall which are protruded outward as in related art are not necessary, and by their spaces, an installation space for the battery becomes wider.

Further, because the battery protection frame is fixed in its internal portion, compared to a case where the battery protection frame is fixed to the vehicle body component in an outer portion of the battery protection frame, the distance between a portion on which a fixing force of the fixation member is exerted in the battery protection frame and the vehicle body component becomes short. Accordingly, mounting rigidity of the battery protection frame on a vehicle body is enhanced.

The vehicle-body-side frame according to a second aspect of the present disclosure may be provided with a cover portion that is formed to extend along the outer surface, in which the hole portion is formed, in the battery protection frame and that covers the hole portion from an outside of the battery protection frame.

With this configuration, entrance of foreign objects into the internal portion of the battery protection frame through the hole portion can be inhibited. Further, when the hole portion is left open, this might lead to lowering of aerodynamic performance in traveling, but with this configuration, because the hole portion is covered, lowering of aerodynamic performance in traveling can be avoided.

The battery protection frame according to a third aspect of the present disclosure may be disposed below the vehicle body component. In this case, in the internal portion of the battery protection frame, a partition wall portion that marks off the space in an up-down direction can be provided between an upper wall portion and a lower wall portion of the battery protection frame, and the fixation member can exert a fixing force on the partition wall portion.

With this configuration, the partition wall portion is provided, and rigidity of the battery protection frame itself can thereby further be enhanced. In this case, the fixing force is exerted on the partition wall portion by the fixation member, the distance between the portion on which the fixing force of the fixation member is exerted in the battery protection frame and the vehicle body component can thereby be made sufficiently short, and further, mounting rigidity of the battery protection frame on the vehicle body can sufficiently be enhanced.

The vehicle-body-side frame according to a fourth aspect of the present disclosure may include a suspension connecting portion with which at least a part of a suspension apparatus is capable of being coupled. With this configuration, because the vehicle-body-side frame includes the suspension connecting portion, rigidity of the vehicle-body-side frame is enhanced. Because the highly rigid vehicle-body-side frame is coupled with the battery protection frame, rigidity of the battery protection frame can further be enhanced.

The battery protection frame according to a fifth aspect of the present disclosure may extend in a vehicle width direction. The vehicle-body-side frame includes a lower plate portion that extends in the vehicle width direction along a lower wall portion of the battery protection frame and is fixed to the lower wall portion and a vertical plate portion that extends in the vehicle width direction along one wall portion of the battery protection frame in a vehicle front-rear direction and is fixed to the one wall portion.

With this configuration, because the lower plate portion and the vertical plate portion of the vehicle-body-side frame can respectively be fixed to the lower wall portion of the battery protection frame and the one wall portion in the vehicle front-rear direction, the vehicle-body-side frame can firmly be fixed to the battery protection frame.

The hole portion according to a sixth aspect of the present disclosure is formed in the lower wall portion of the battery protection frame. In this case, it becomes possible that the hole portion is covered from below by using the lower plate portion of the vehicle-body-side frame.

Advantages

As described above, a vehicle-body-side frame is coupled with a battery protection frame which has a hollow cross-section, and rigidity of the battery protection frame itself can thereby be enhanced. In addition, the battery protection frame is, in its internal portion, fixed to a vehicle body component, and mounting rigidity of the battery protection frame on a vehicle body can be enhanced as well.

DETAILED DESCRIPTION

The present disclosure will hereinafter be described in detail based on drawings. Note that the description in the following is exemplary and is not at all intended to restrict the present disclosure, applications thereof, or uses thereof.

Figure 1:
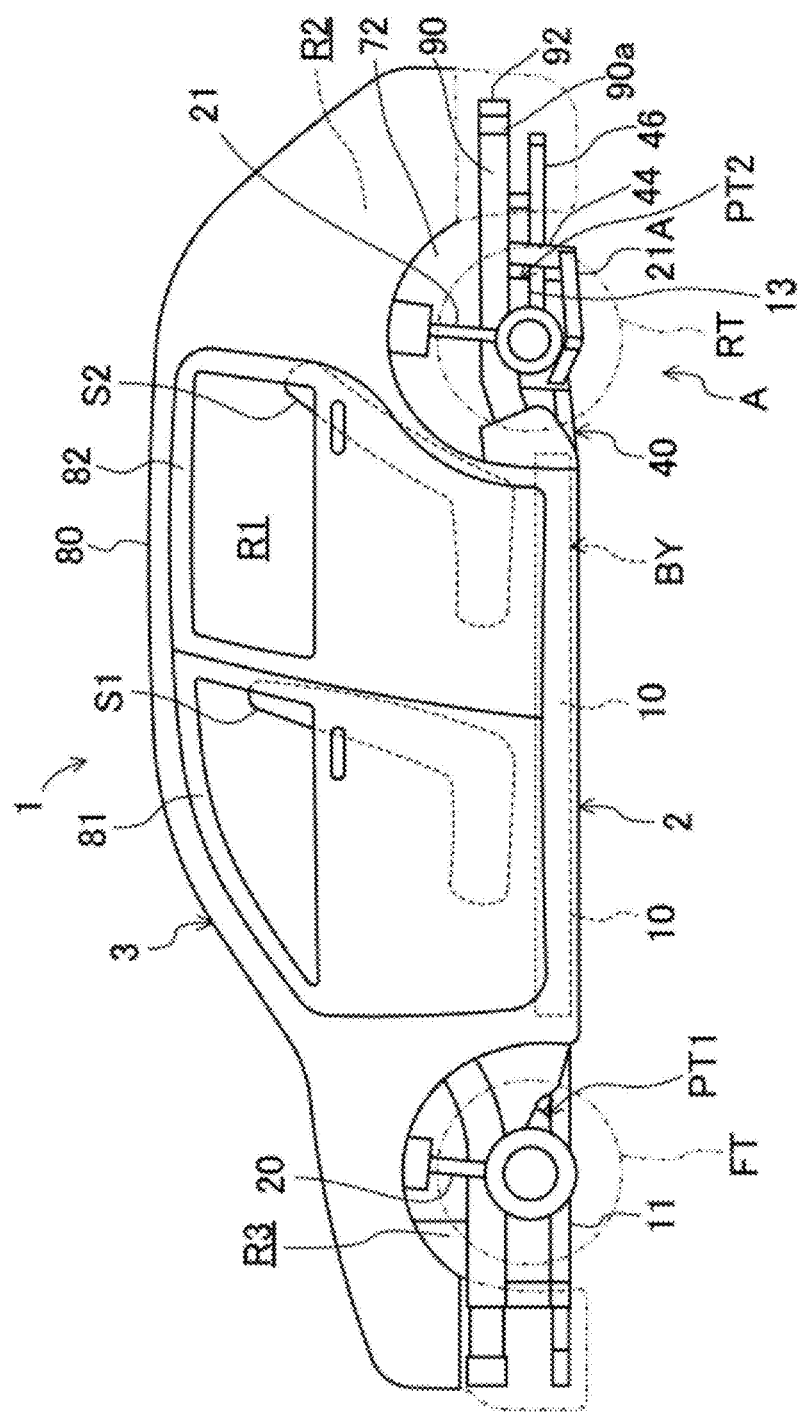
FIG. 1 is a side view of an electric vehicle according to an embodiment, in which a part of the electric vehicle is omitted.
Figure 2:
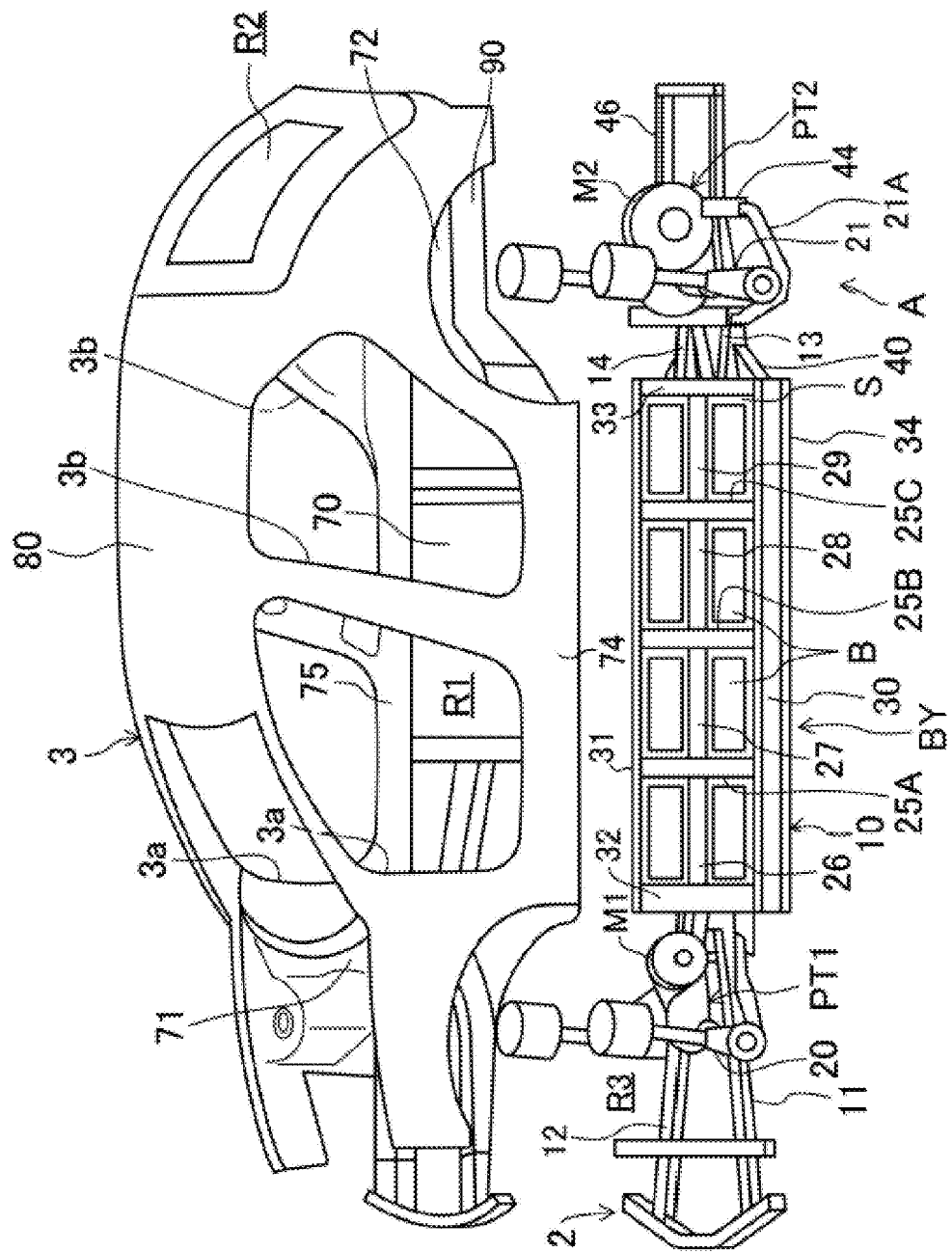
FIG. 2 is a side view illustrating a state where the electric vehicle is divided into a lower structure and an upper structure.

FIG. 1 is a left side view of an electric vehicle (electric automobile) 1 including a vehicle-body structure A according to the present disclosure. As illustrated in FIG. 2, the electric vehicle 1 includes a lower structure 2 and an upper structure 3. In FIG. 1, a front bumper, a rear bumper, front and rear wheels, and so forth are omitted and are illustrated by imaginary lines, and each portion is schematically illustrated. In FIG. 2, in addition to the components omitted in FIG. 1, doors, a bonnet hood, a front fender, window glass, front and rear lighting devices, interior materials, and so forth are omitted, and each portion is schematically illustrated.

Note that in the description of the embodiment, a vehicle front side will simply be referred to as "front", a vehicle rear side will simply be referred to as "rear", a vehicle right side will simply be referred to as "right", and a vehicle left side will simply be referred to as "left". A right-left direction of the vehicle is a vehicle width direction.

As illustrated in FIG. 1, the electric vehicle 1 is a passenger automobile. The electric vehicle 1 may be of any of a sedan type, a hatch-back type, a minivan type, and so forth, and its shape is not particularly limited. As illustrated in FIG. 2, in the electric vehicle 1, a vehicle cabin R1 is formed which serves as a staying space (vehicle cabin inside space) for an occupant. As illustrated in FIG. 1, a front seat (seat) S1 is provided on a front side in the vehicle cabin R1, and a rear seat S2 is provided in rear of the front seat S1 in the vehicle cabin R1. In the rear of the rear seat S2, a trunk R2 is provided in accordance with necessity. The vehicle cabin R1 and the trunk R2 are provided to the upper structure 3. Note that in the vehicle cabin R1, only the front seat S1 may be provided, or a third row seat may be provided in the rear of the rear seat S2.

Figure 3:
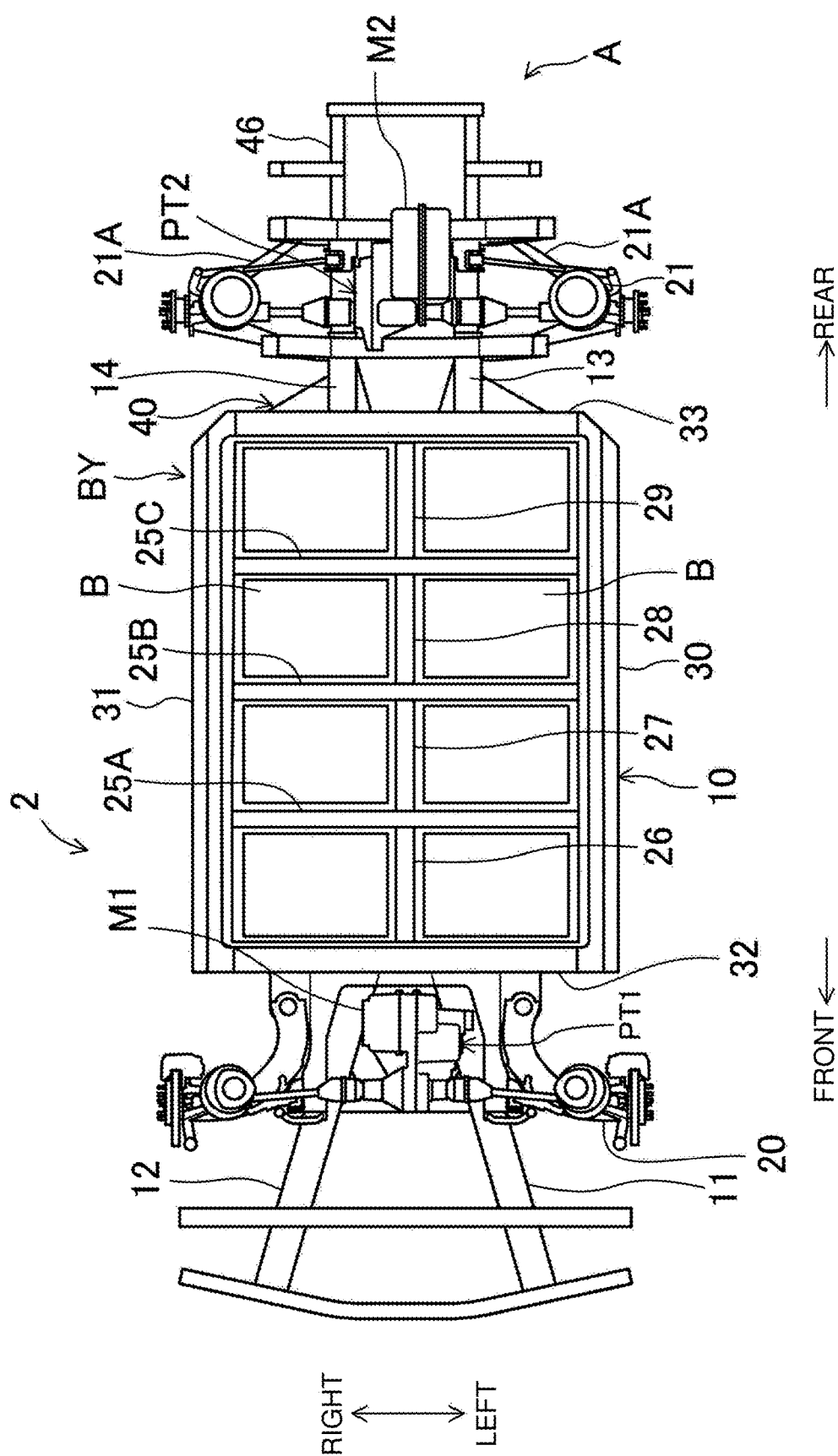
FIG. 3 is a plan view of the lower structure.

Meanwhile, a space (front-side space) in front of the vehicle cabin R1 as a front portion of the electric vehicle 1 can be set as a power chamber R3, for example. That is, as illustrated in FIG. 3, the vehicle-body structure A is provided to the electric vehicle 1 which includes a front-side traveling motor M1 installed in a vehicle front portion, a rear-side traveling motor M2 installed in a vehicle rear portion, batteries B supplying electric power to the traveling motors M1 and M2, and a battery casing 10 housing the batteries B. The battery casing 10 is disposed below a floor panel 70 described later.

The front-side traveling motor M1 produces a driving force for driving left and right front wheels FT, and a front-side power train PT1 is configured with only the front-side traveling motor M1 or with the front-side traveling motor M1, a speed reducer, a transmission, and so forth. Further, the rear-side traveling motor M2 illustrated in FIG. 2 and FIG. 3 produces a driving force for driving left and right rear wheels RT (illustrated in FIG. 1), and a rear-side power train PT2 is configured with only the rear-side traveling motor M2 or with the rear-side traveling motor M2, a speed reducer, a transmission, and so forth.

In the present embodiment, the rear-side traveling motor M2 is configured to produce a highest output (maximum torque) which is high compared to the front-side traveling motor M1, and the rear-side traveling motor M2 has a larger size than the front-side traveling motor M1. Accompanying that, the rear-side power train PT2 becomes larger than the front-side power train PT1. Note that the rear-side traveling motor M2 may produce a highest output which is low compared to the front-side traveling motor M1, or the rear-side traveling motor M2 and the front-side traveling motor M1 may produce equivalent highest outputs. Further, only the front-side power train PT1 may be provided, or only the rear-side power train PT2 may be provided. Further, for example, in a case of a large-sized vehicle, the front-side traveling motor M1 and the rear-side traveling motor M2 are installed which are large compared to a small-sized vehicle.

As illustrated in FIG. 2, the lower structure 2 includes the battery casing 10, a pair of left and right front side frames 11 and 12 which extend forward in front of the battery casing 10, and a pair of left and right rear frames 13 and 14 which extend rearward in the rear of the battery casing 10. The left and right rear frames 13 and 14 extend in a front-rear direction in the vehicle rear portion. A reference numeral 11 denotes the left front side frame, and a reference numeral 12 denotes the right front side frame. Further, a reference numeral 13 denotes the left rear frame, and a reference numeral 14 denotes the right rear frame. In FIG. 2, a lid body 35 (described later) of the battery casing 10 is detached.

In a case of a common electric automobile, a battery casing is often formed as a separate body from a vehicle body and is often detachable from a portion below a floor; however, in the present embodiment, not only the battery casing 10, by integrating the left and right front side frames 11 and 12 and the left and right rear frames 13 and 14 with the battery casing 10, but also the front side frames 11 and 12 and the rear frames 13 and 14, together with the battery casing 10, are detachable from the upper structure 3.

Specifically, the electric vehicle 1 of the present embodiment is configured to be capable of being divided, in an up-down direction, into the lower structure 2 having the battery casing 10 and the upper structure 3 forming the vehicle cabin R1 and the trunk R2. Being capable of being divided in the up-down direction means that without using welding, adhesion, or the like, the lower structure 2 is integrated with the upper structure 3 by using fastening members such as bolts, nuts, and screws. Accordingly, because the lower structure 2 can be separated from the upper structure 3 in accordance with necessity when maintenance or repairs are performed after the electric vehicle 1 is passed into the hands of a user, high maintainability is achieved. Note that fastening members used in the following description include bolts, nuts, screws, and so forth.

Here, as a vehicle-body structure of an automobile, a vehicle-body structure of a ladder frame type has been known. In a case of the vehicle-body structure of the ladder frame type, the vehicle-body structure is being capable of being divided, in the up-down direction, into a ladder frame and a cabin, but the ladder frame continuously extends in the front-rear direction and thus mainly receives a collision load in a front collision and a rear collision. In a side collision, the ladder frame only subsidiarily receives a collision load, and the collision load is mainly received by the cabin. As described above, in the vehicle-body structure of the ladder frame type, usually, different members receive collision loads between the front collision and rear collision and the side collision.

On the other hand, in a case of the electric vehicle 1 of the present embodiment, the lower structure 2 having the front side frames 11 and 12 and the rear frame 13 and 14 and the upper structure 3 are capable of being divided; however, a technical idea of the present embodiment is largely different from the vehicle-body structure of the ladder frame type in related art in the point that in both cases of the front collision and rear collision and the side collision, a collision load is received by the lower structure 2 and the upper structure 3, and the collision load is capable of being dispersedly absorbed by both of the structures 2 and 3. In the following, structures of the lower structure 2 and the upper structure 3 will be described in detail.

(Lower Structure)

First, the lower structure 2 will be described. The lower structure 2 includes the front and rear power trains PT1 and PT2, the front wheels FT, the rear wheels RT, a front suspension apparatus 20, a rear suspension apparatus 21, and so forth in addition to the battery casing 10, the front side frames 11 and 12, and the rear frames 13 and 14. Forms of the front suspension apparatus 20 and the rear suspension apparatus 21 are not particularly specified.

A battery unit BY is configured with the battery casing 10 and the batteries B housed in an internal portion of the battery casing 10, but in addition to those, for example, a battery cooling device and so forth may be included in the battery unit BY.

The battery casing 10 is a large casing which is formed, below the floor panel 70 of the upper structure 3, to be spanned from a left end portion vicinity to a right end portion vicinity of the floor panel 70 and to be spanned from a front end portion vicinity to a rear end portion vicinity of the floor panel 70. As described above, the battery casing 10 is disposed in a wide range of a lower region of the floor panel 70, and it thereby becomes possible to install the battery B with a large capacity in the electric vehicle 1. The battery B may be a lithium-ion battery, a solid-state battery, or the like or may be another secondary cell. Further, the battery B may be a so-called battery cell or may be a battery pack housing plural battery cells. In the present embodiment, the battery B is configured with a battery pack, and plural battery packs are installed in a state where those are aligned in the front-rear direction and the left-right direction.

The battery casing 10 includes a left-side battery frame 30, a right-side battery frame 31, a front-side battery frame 32, a rear-side battery frame 33, a bottom plate 34, and the lid body 35 (illustrated in FIG. 5) which covers the batteries B from above. Note that FIG. 2 and FIG. 3 illustrate a state where the lid body 35 is detached.

The left-side battery frame 30, the right-side battery frame 31, the front-side battery frame 32, and the rear-side battery frame 33 are configured with an extruded material or the like of an aluminum alloy, for example, but may be configured with an aluminum alloy plate material or a press-formed material of a steel plate as well. The bottom plate 34 can also be configured with an extruded material. In the following description, "extruded material" denotes an extruded material of an aluminum alloy, and "press-formed material" denotes an aluminum alloy plate material or a press-formed material of a steel plate. Further, each member may be configured with a casting, for example.

All of cross-sectional shapes of the left-side battery frame 30, the right-side battery frame 31, the front-side battery frame 32, and the rear-side battery frame 33 in respective orthogonal directions to their longitudinal directions are rectangular shapes. Further, the left-side battery frame 30, the right-side battery frame 31, the front-side battery frame 32, and the rear-side battery frame 33 are all arranged at the same height and extend in generally horizontal directions.

The left-side battery frame 30 and the right-side battery frame 31 are outer-side battery frames which extend in the front-rear direction on vehicle-width-direction outer sides of the batteries B. The left-side battery frame 30 is provided to a left-side portion of the battery casing 10 and extends in the front-rear direction along a left side sill 74. The left-side battery frame 30 is mounted on the left side sill 74 by fastening members or the like. The right-side battery frame 31 is provided to a right-side portion of the battery casing 10 and extends in the front-rear direction along a right side sill 75. The right-side battery frame 31 is mounted on the right side sill 75 by fastening members or the like. The left-side battery frame 30 and the right-side battery frame 31 are battery protection frames which protect the batteries B.

Further, the front-side battery frame 32 is provided to a front portion of the battery casing 10 and extends in the left-right direction. Further, the rear-side battery frame 33 extends in the left-right direction in a rear portion of the battery casing 10, that is, in the rear of the batteries B. The front-side battery frame 32 and the rear-side battery frame 33 are battery protection frames which protect the batteries B.

A left end portion of the front-side battery frame 32 is connected with a front end portion of the left-side battery frame 30, and a right end portion of the front-side battery frame 32 is connected with a front end portion of the right-side battery frame 31. A left end portion of the rear-side battery frame 33 is connected with a rear end portion of the left-side battery frame 30, and a right end portion of the rear-side battery frame 33 is connected with a rear end portion of the right-side battery frame 31. Consequently, the left-side battery frame 30, the right-side battery frame 31, the front-side battery frame 32, and the rear-side battery frame 33 are members which configure a rack frame formed to surround all of the batteries B in a plan view.

Both of the left and right end portions of the front-side battery frame 32 and both of the left and right end portions of the rear-side battery frame 33 are respectively mounted on the left and right side sills 74 and 75 by fastening members or the like. Further, both of the left and right end portions of the rear-side battery frame 33 are connected with the left-side battery frame 30 and the right-side battery frame 31 and are thus mounted on the left and right side sills 74 and 75 via the left-side battery frame 30 and the right-side battery frame 31. Further, both of the left and right end portions of the rear-side battery frame 33 may directly be mounted on the left and right side sills 74 and 75.

Figure 4:
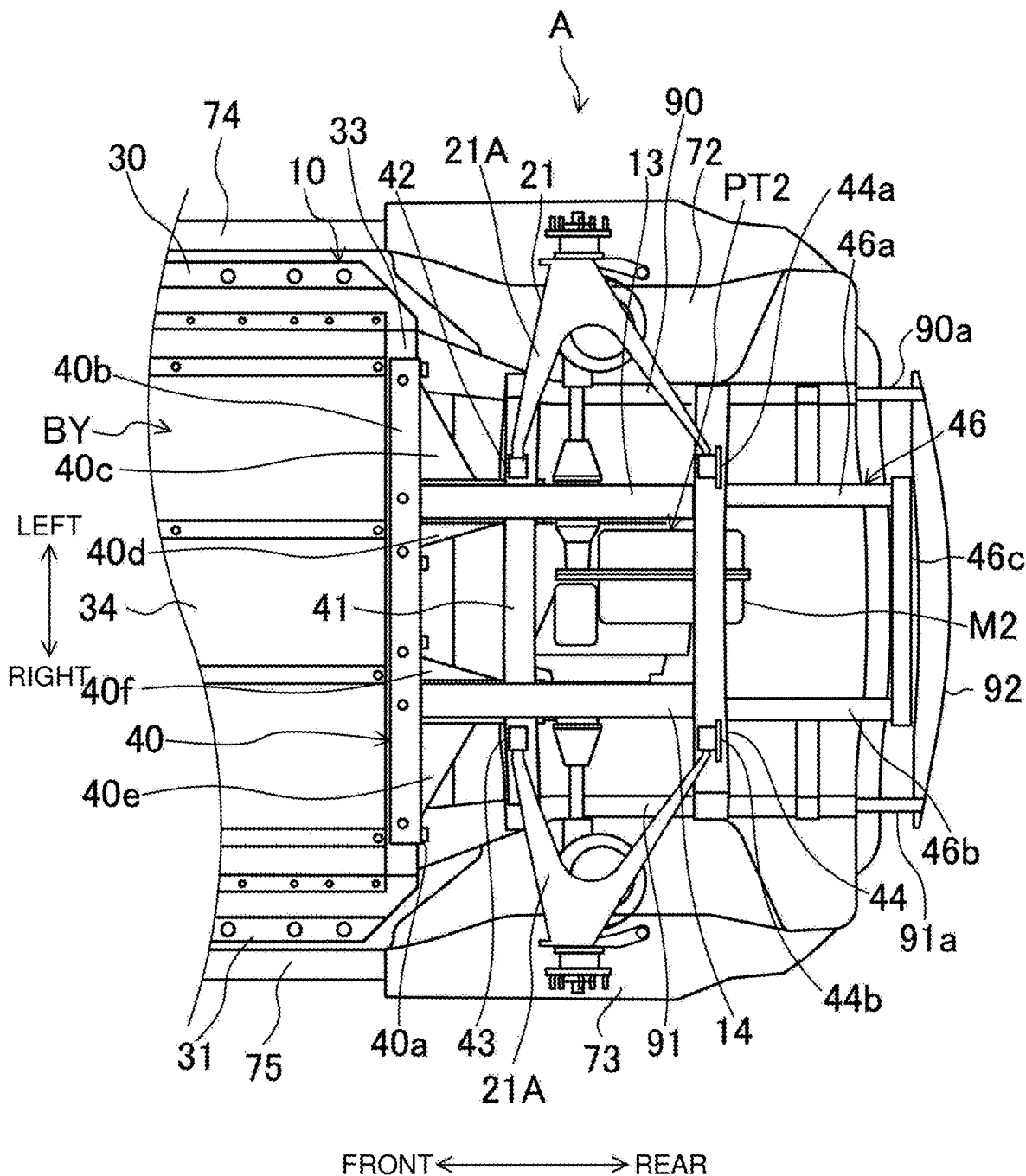
FIG. 4 is a bottom view of a rear-side portion of a vehicle-body structure.

The bottom plate 34 illustrated in FIG. 4 and so forth extends generally horizontally and is fixed to lower surfaces of the left-side battery frame 30, the right-side battery frame 31, the front-side battery frame 32, and the rear-side battery frame 33. Further, the lid body 35 illustrated in FIG. 5, FIG. 6, and so forth is fixed to upper surfaces of the left-side battery frame 30, the right-side battery frame 31, the front-side battery frame 32, and the rear-side battery frame 33. In other words, the lid body 35 is mounted on the battery frames 30 to 33. The rear-side battery frame 33 is protruded to the rear of a rear portion of the lid body 35.

When the lid body 35 is mounted on the battery frames 30 to 33, for example, fastening members may be used, or adhesion, welding, or the like may be used. Consequently, a battery housing space S housing the batteries B (illustrated in FIG. 2) is marked off and formed with the left-side battery frame 30, the right-side battery frame 31, the front-side battery frame 32, the rear-side battery frame 33, the bottom plate 34, and the lid body 35.

The size of the battery housing space S can be changed in accordance with the capacity of the installed batteries B. The size of the battery housing space S is capable of being easily changed by changing lengths of the left-side battery frame 30, the right-side battery frame 31, the front-side battery frame 32, and the rear-side battery frame 33 and a shape of the bottom plate 34. For example, in a case where the electric vehicle 1 is a small vehicle which has a short wheelbase and narrow treads, the left-side battery frame 30, the right-side battery frame 31, the front-side battery frame 32, and the rear-side battery frame 33 are made short, the shapes of the bottom plate 34 and the lid body 35 are made small in response to the shortening, and the battery housing space S thereby becomes small in accordance with the small vehicle. On the other hand, in a case of a large vehicle, the left-side battery frame 30, the right-side battery frame 31, the front-side battery frame 32, and the rear-side battery frame 33 are made long, the shapes of the bottom plate 34 and the lid body 35 are made large in response to the elongation, and the battery housing space S thereby becomes large in accordance with the large vehicle. In a case where the left-side battery frame 30, the right-side battery frame 31, the front-side battery frame 32, and the rear-side battery frame 33 are configured with the extruded material, the lengths can easily be changed. Further, the bottom plate 34 can also be configured with the extruded material, and its shape can thereby easily be changed.

An upper portion of the battery housing space S may be closed by the above lid body 35 or may be closed by the floor panel 70 of the upper structure 3. In the battery housing space S, other than the batteries B, a cooling device cooling the batteries B, a heating device heating the batteries B, and so forth (temperature adjustment devices) can also be provided. Further, electric power of the batteries B is supplied to the traveling motors M1 and M2 via a control device. In addition, it is possible to charge the batteries B via a charging socket, a contactless charger, or the like.

As illustrated in FIG. 2, in the internal portion of the battery casing 10 configuring the battery unit BY, as strength members extending in the left-right direction, first to third inside-casing members (inside-unit members) 25A, 25B, and 25C are provided. All of heights of the first to third inside-casing members 25A, 25B, and 25C are the same and are generally the same as the heights of the left-side battery frame 30 and so forth. The inside-casing members 25A, 25B, and 25C may be configured with the extruded material or may be configured with the press-formed material. In the present embodiment, three inside-casing members 25A, 25B, and 25C are provided, but the number of inside-casing members 25A, 25B, and 25C may be increased or decreased in accordance with the dimension of the battery casing 10 in the front-rear direction. The first to third inside-casing members 25A, 25B, and 25C are second members.

The first to third inside-casing members 25A, 25B, and 25C are arranged at distances from each other in the front-rear direction, the first inside-casing member 25A is in a foremost position, and the third inside-casing member 25C is in a rearmost position. A lower portion of each of the inside-casing members 25A, 25B, and 25C is fixed to an upper surface of the bottom plate 34. Further, a left end portion of each of the inside-casing members 25A, 25B, and 25C is fixed to an inner surface (right-side surface) of the left-side battery frame 30, and a right end portion of each of the inside-casing members 25A, 25B, and 25C is fixed to an inner surface (left-side surface) of the right-side battery frame 31. In other words, the inside-casing members 25A, 25B, and 25C are members which connect the left-side battery frame 30 and the right-side battery frame 31 together.

In the internal portion of the battery casing 10, as strength members extending in the front-rear direction, a front central member (inside-unit member) 26 and first to third rear central members (inside-unit members) 27 to 29 are provided. The front central member 26 and the first to third rear central members 27 to 29 are arranged at generally the same heights and are provided at a center of the battery casing 10 in the left-right direction. Lower end portions of the front central member 26 and the first to third rear central members 27 to 29 are mounted on the upper surface of the bottom plate 34. The front central member 26 and the first to third rear central members 27 to 29 are first members. The front central member 26 and first to third rear central members 27 to 29 and the first to third inside-casing members 25A, 25B, and 25C intersect with each other.

The front central member 26 is arranged between the front-side battery frame 32 and the first inside-casing member 25A, a front end portion of the front central member 26 is fixed to a central portion of the front-side battery frame 32 in the left-right direction, and a rear end portion of the front central member 26 is fixed to a central portion of the first inside-casing member 25A in the left-right direction. Consequently, the front-side battery frame 32 is a member which extends so as to connect the front end portions of the left-side battery frame 30 and the right-side battery frame 31 with the front end portion of the front central member 26.

The first rear central member 27 is arranged between the first inside-casing member 25A and the second inside-casing member 25B, a front end portion of the first rear central member 27 is fixed to the central portion of the first inside-casing member 25A in the left-right direction, and a rear end portion of the first rear central member 27 is fixed to a central portion of the second inside-casing member 25B in the left-right direction. Further, the second rear central member 28 is arranged between the second inside-casing member 25B and the third inside-casing member 25C, a front end portion of the second rear central member 28 is fixed to the central portion of the second inside-casing member 25B in the left-right direction, and a rear end portion of the second rear central member 28 is fixed to a central portion of the third inside-casing member 25C in the left-right direction. Further, the third rear central member 29 is arranged between the third inside-casing member 25C and the rear-side battery frame 33, a front end portion of the third rear central member 29 is fixed to the central portion of the third inside-casing member 25C in the left-right direction, and a rear end portion of the third rear central member 29 is fixed to a central portion of the rear-side battery frame 33 in the left-right direction. Consequently, because the first to third inside-casing members 25A, 25B, and 25C and the front central member 26 and first to third rear central members 27 to 29 are disposed in a lattice manner in the internal portion of the battery casing 10 and are coupled with each other, a reinforcement effect for the battery casing 10 is further enhanced.

When an imaginary straight line extending in the front-rear direction is presumed in a plan view, the positions of the front central member 26 and the first to third rear central members 27 to 29 in the left-right direction are set such that the positions are arranged on the imaginary straight line. In other words, the first to third rear central members 27 to 29 are provided to be positioned on a rearward imaginary extension line of the front central member 26. Note that the front central member 26 and the first to third rear central members 27 to 29 may be configured with one member which is continuous in the front-rear direction.

Figure 5:
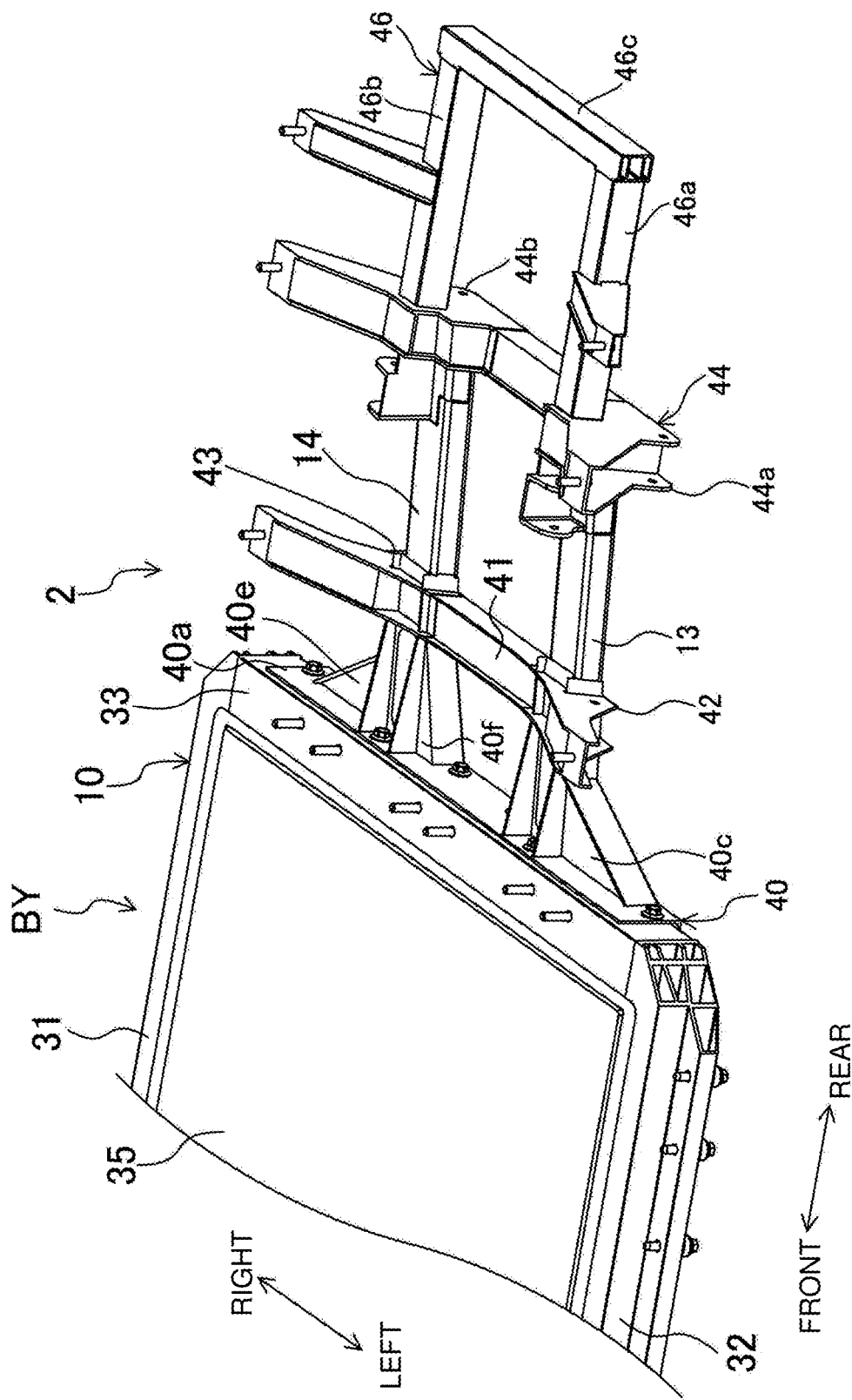
FIG. 5 is a perspective view of a rear-side portion of the lower structure as seen from above.
Figure 6:
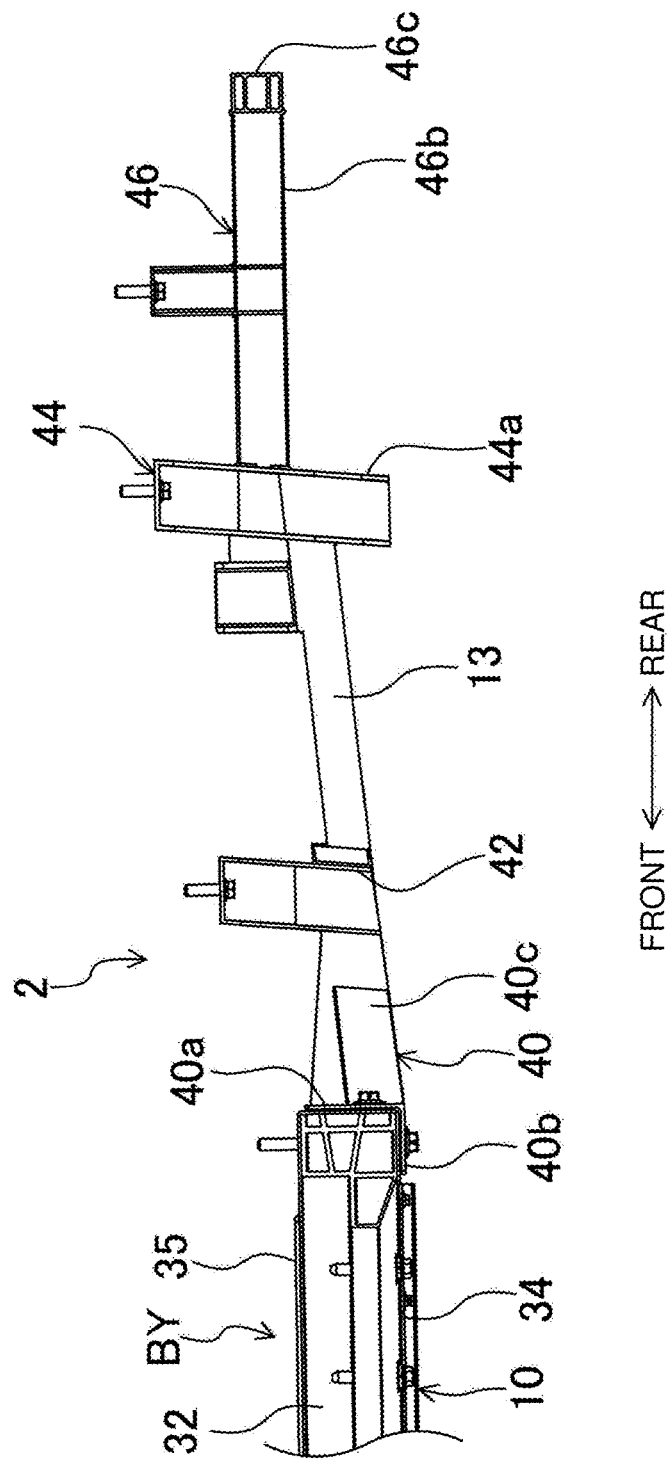
FIG. 6 is a side view of the rear-side portion of the lower structure.

As also illustrated in FIG. 5 and FIG. 6, the lower structure 2 includes the rear-side battery frame 33, the left and right rear frames 13 and 14, and a vehicle-body-side frame 40, and those members configure a part of the vehicle-body structure A. The rear frames 13 and 14 can be configured with the extruded material, the press-formed material, or the like, for example. In the present embodiment, because the rear frames 13 and 14 are configured with the extruded material, their cross-sectional shapes in a direction orthogonal to the front-rear direction are generally equivalent from front end portions to rear end portions.

The left and right rear frames 13 and 14 are mounted on the rear-side battery frame 33 configuring the rear portion of the battery casing 10 via the vehicle-body-side frame 40. In other words, the vehicle-body-side frame 40 extends toward the rear-side battery frame 33 and also extends in the left-right direction along the rear-side battery frame 33, front portions of the left and right rear frames 13 and 14 are fixed to the vehicle-body-side frame 40, and the vehicle-body-side frame 40 is coupled with the rear-side battery frame 33.

Specifically, the vehicle-body-side frame 40 is formed with a member which is integrally shaped by using metal and can also be referred to as cross member because the vehicle-body-side frame 40 extends in the left-right direction. The front portions of the left and right rear frames 13 and 14 are fixed to the vehicle-body-side frame 40 by using welding, adhesion, fastening members, or the like. Metal which configures the vehicle-body-side frame 40 is not particularly limited. For example, aluminum and so forth can be raised, and in this case, the vehicle-body-side frame 40 can be formed by aluminum die-casting.

The left and right rear frames 13 and 14 are mounted on the rear-side battery frame 33 via the vehicle-body-side frame 40, but the front portions of the rear frames 13 and 14 can be caused to adjoin a rear surface of the rear-side battery frame 33. Consequently, the rear frames 13 and 14 extend rearward from the rear-side battery frame 33. Note that the front portions of the rear frames 13 and 14 may slightly be spaced apart rearward from the rear surface of the rear-side battery frame 33. In this case also, viewing those as the whole, it can be considered that the rear frames 13 and 14 extend rearward from the rear-side battery frame 33.

The front portion of the left rear frame 13 is arranged to correspond to a section on a left side of a center of the rear-side battery frame 33 in the left-right direction. Further, the front portion of the right rear frame 14 is arranged to correspond to a section on a right side of the center of the rear-side battery frame 33 in the left-right direction. Accordingly, a distance between the left and right rear frames 13 and 14 becomes a predetermined distance. The distance between the rear frames 13 and 14 is set narrower than a distance between the left-side battery frame 30 and the right-side battery frame 31 of the battery casing 10. Further, heights of the left and right rear frames 13 and 14 are generally the same.

Figure 8:
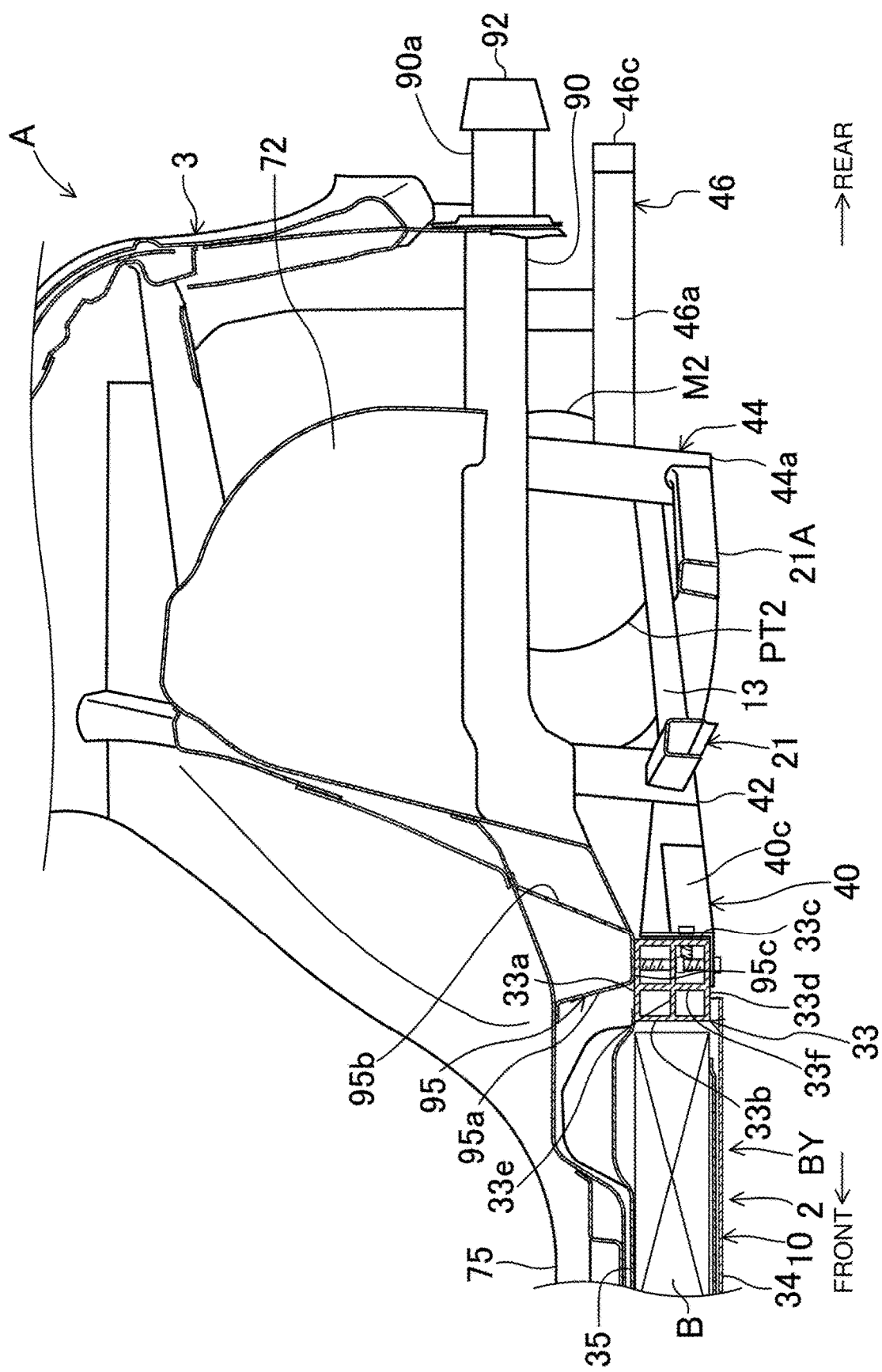
FIG. 8 is a cross-sectional view in which a portion of the vehicle-body structure on a rear side and a left side is sectioned in a vertical direction.
Figure 9:
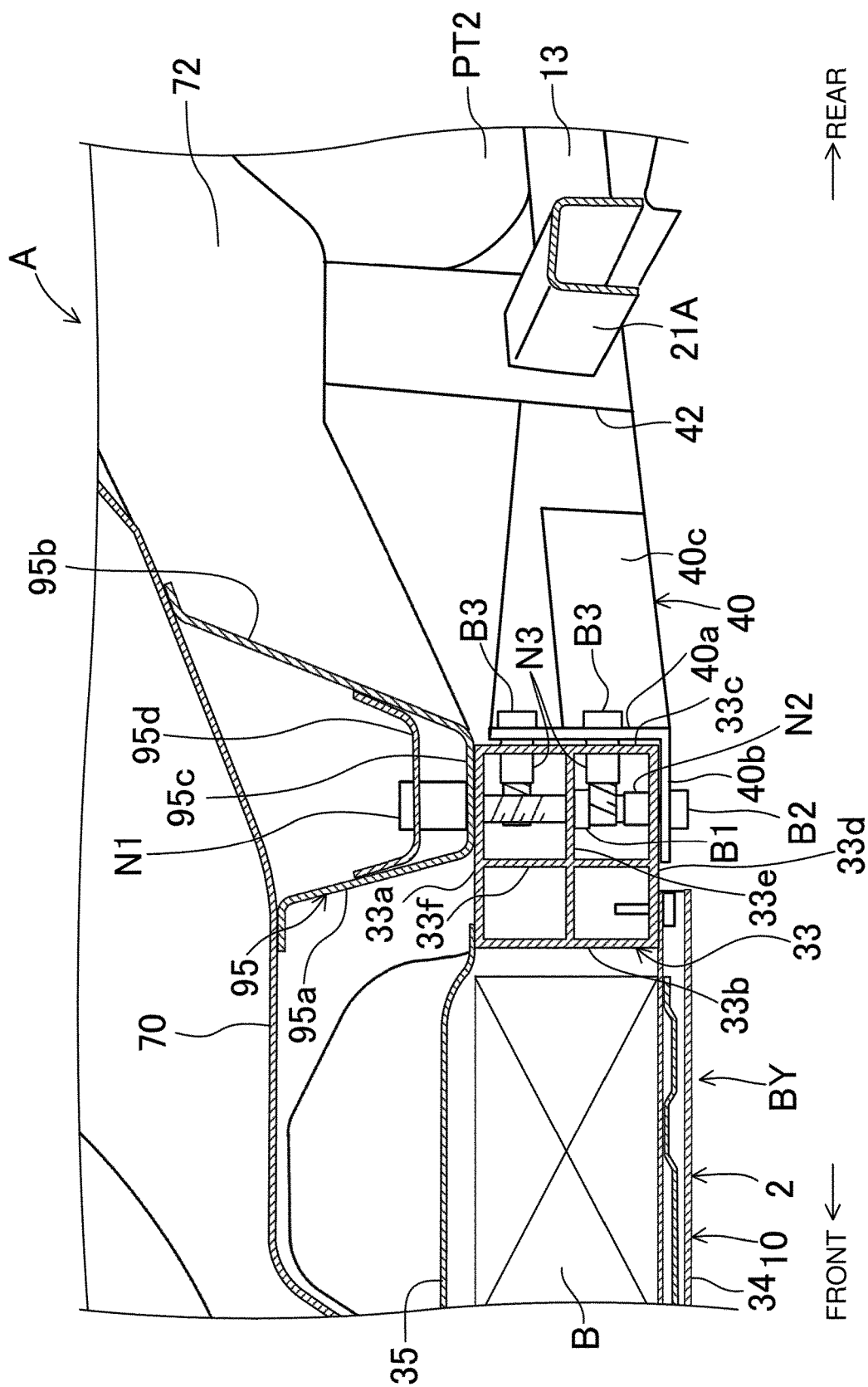
FIG. 9 is an enlarged cross-sectional view in which the portion of the vehicle-body structure on the rear side and the left side is sectioned in the vertical direction.
Figure 10:
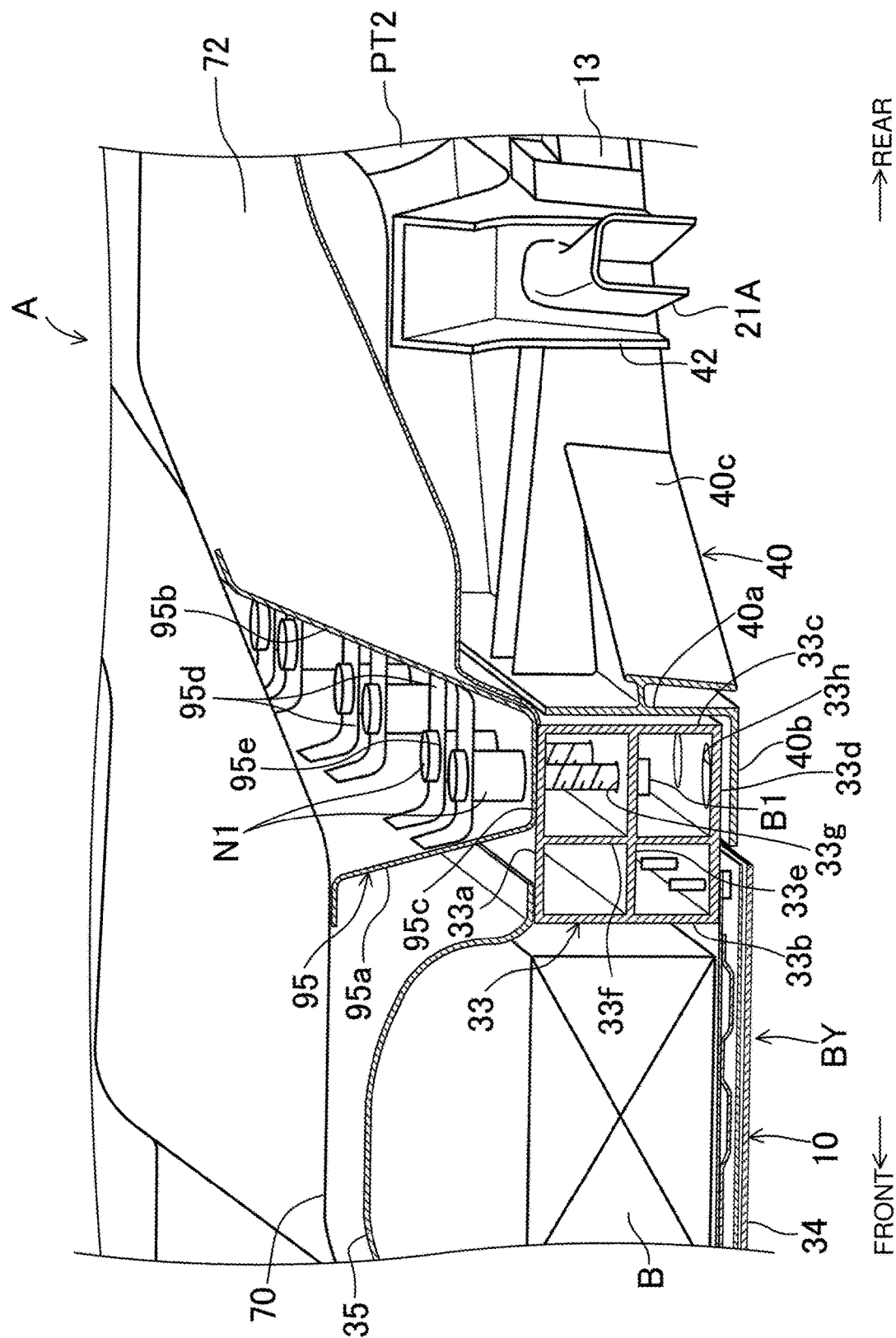
FIG. 10 is a perspective cross-sectional view in which the portion of the vehicle-body structure on the rear side and the left side is sectioned in the vertical direction.

As illustrated in FIG. 8 to FIG. 10, the rear-side battery frame 33 has a hollow cross-section in which the cross-section in a direction orthogonal to the longitudinal direction is hollow, and a space is formed in an internal portion. That is, the rear-side battery frame 33 has an upper wall portion 33a which extends in the left-right direction, a front wall portion 33b which extends downward from a front edge portion of the upper wall portion 33a and extends in the left-right direction, a rear wall portion 33c which extends downward from a rear edge portion of the upper wall portion 33a and extends in the left-right direction, and a lower wall portion 33d which extends from a lower edge portion of the front wall portion 33b to a lower edge portion of the rear wall portion 33c and extends in the left-right direction. Consequently, the cross-section of the rear-side battery frame 33 has a rectangular shape, but a cross-sectional shape of the rear-side battery frame 33 is not limited to a rectangular shape but may be a complicated polygonal shape. Dimensions of the upper wall portion 33a and the lower wall portion 33d in the front-rear direction are set the same, but the dimensions are not limited to this, and one of those may be shorter than the other. Further, dimensions of the front wall portion 33b and the rear wall portion 33c in the up-down direction are set the same, but the dimensions are not limited to this, and one of those may be shorter than the other.

In the internal portion of the rear-side battery frame 33, a first partition wall portion 33e which marks off the space in the internal portion of the rear-side battery frame 33 in the up-down direction is provided between the upper wall portion 33a and the lower wall portion 33d. The first partition wall portion 33e extends in the front-rear direction from an intermediate portion of the front wall portion 33b in the up-down direction to an intermediate portion of the rear wall portion 33c in the up-down direction and also extends in the left-right direction. The first partition wall portion 33e is generally parallel with the upper wall portion 33a, and the first partition wall portion 33e is generally parallel with the lower wall portion 33d. In the present embodiment, the first partition wall portion 33e is horizontal but may be inclined. Further, a third partition wall portion, a fourth partition wall portion, or the like may be provided.

In the internal portion of the rear-side battery frame 33, a second partition wall portion 33f which marks off the space in the internal portion of the rear-side battery frame 33 in the front-rear direction is provided between the front wall portion 33b and the rear wall portion 33c. The second partition wall portion 33f and the first partition wall portion 33e are generally orthogonal and are integrated together in a state where an intermediate portion of the second partition wall portion 33f in the up-down direction intersects with an intermediate portion of the first partition wall portion 33e in the front-rear direction. The second partition wall portion 33f extends in the front-rear direction from an intermediate portion of the upper wall portion 33a in the front-rear direction to an intermediate portion of the lower wall portion 33d in the up-down direction and also extends in the left-right direction. The second partition wall portion 33f is generally parallel with the front wall portion 33b, and the second partition wall portion 33f is generally parallel with the rear wall portion 33c. In the present embodiment, the second partition wall portion 33f is perpendicular but may be inclined.

As illustrated in FIG. 9, the vehicle-body-side frame 40 includes a vertical plate portion 40a which extends in the vehicle width direction and the up-down direction along the rear wall portion 33c of the rear-side battery frame 33 and a lower plate portion 40b which extends forward from a lower edge portion of the vertical plate portion 40a along the lower wall portion 33d of the rear-side battery frame 33 and which extends also in the vehicle width direction. The vertical plate portion 40a and the lower plate portion 40b are respectively fixed to the rear wall portion 33c and the lower wall portion 33d of the rear-side battery frame 33 by plural fixation members which will be described later. In such a manner, the vertical plate portion 40a and the lower plate portion 40b of the vehicle-body-side frame 40 are respectively fixed to the rear wall portion 33c and the lower wall portion 33d of the rear-side battery frame 33, and mounting rigidity of the vehicle-body-side frame 40 with respect to the rear-side battery frame 33 can thereby be enhanced.

As illustrated in FIG. 4 and FIG. 5, the vehicle-body-side frame 40 includes a left outside rib 40c which is positioned in a left side area of the left rear frame 13, a left inside rib 40d which is positioned in a right side area of the left rear frame 13, a right outside rib 40e which is positioned in a right side area of the right rear frame 14, and a right inside rib 40f which is positioned in a left side area of the right rear frame 14. The left outside rib 40c and the left inside rib 40d inhibit collapse of the left rear frame 13 in the left-right direction, and the right outside rib 40e and the right inside rib 40f inhibit collapse of the right rear frame 14 in the left-right direction. In addition, because the ribs 40c, 40d, 40e, and 40f are arranged to jut out in the left-right direction of the left and right rear frames 13 and 14, for example, in a case where an impact load from the rear is exerted on the rear frames 13 and 14, the impact load can be dispersed to a wide range in the left-right direction by using the ribs 40c, 40d, 40e, and 40f.

The vehicle-body-side frame 40 is provided with a connecting portion 41 which couples rear end portions of the left outside rib 40c and the left inside rib 40d with rear end portions of the right outside rib 40e and the right inside rib 40f. The connecting portion 41 extends in the left-right direction, and the connecting portion 41 couples intermediate portions of the left and right rear frames 13 and 14 in the front-rear direction with each other. In other words, in a plan view, a rectangular closed cross-section is configured with the left and right rear frames 13 and 14, the rear-side battery frame 33, and the connecting portion 41.

On the left side and right side as the vehicle-width-direction outer sides of the vehicle-body-side frame 40, a pair of left and right arm connecting portions (suspension connecting portions) 42 and 43 are respectively provided, with which front portions of left and right suspension arms 21A configuring a part of the rear suspension apparatus 21 are coupled to be rotatable in the up-down direction. The arm connecting portions 42 and 43 extend to a portion above the connecting portion 41, and upper portions of the arm connecting portions 42 and 43 are each mounted on the upper structure 3 to be detachable.

In rear portions of the left and right rear frames 13 and 14, a rear suspension cross member 44 is provided which extends in the left-right direction. The rear portions of the left and right rear frames 13 and 14 are coupled with each other by the rear suspension cross member 44. On the left side and right side as the vehicle-width-direction outer sides of the rear suspension cross member 44, a pair of left and right arm connecting portions 44a and 44b are respectively provided with which rear portions of the left and right suspension arms 21A are coupled to be rotatable in the up-down direction. The arm connecting portions 44a and 44b extend upward, and upper portions of the arm connecting portions 44a and 44b are each mounted on the upper structure 3 to be detachable. Further, in a plan view, a rectangular closed cross-section is configured with the left and right rear frames 13 and 14, the connecting portion 41, and the rear suspension cross member 44.

A subframe 46 is provided in a rear portion of the lower structure 2. The subframe 46 includes a left member 46a which is arranged in the rear of the left rear frame 13 and extends in the front-rear direction, a right member 46b which is arranged in the rear of the right rear frame 14 and extends in the front-rear direction, and a rear member 46c which couples rear end portions of the left member 46a and the right member 46b with each other.

Front portions of the left member 46a and the right member 46b of the subframe 46 are fixed to the rear suspension cross member 44. In other words, the subframe 46 is coupled with the left and right rear frames 13 and 14 via the rear suspension cross member 44. As illustrated in FIG. 6, in a connected state, the left and right rear frames 13 and 14 are positioned below the subframe 46.

(Upper Structure)

Next, the upper structure 3 will be described. As illustrated in FIG. 2, the upper structure 3 includes the floor panel 70, a dash panel (partition wall portion) 71, and the pair of left and right side sills 74 and 75. A reference numeral 74 denotes the left side sill, and a reference numeral 75 denotes the right side sill.

The floor panel 70 configures a floor surface of the vehicle cabin R1 and is formed with a steel plate or the like which extends in the front-rear direction and extends also in the left-right direction. A space above the floor panel 70 serves as the vehicle cabin R1. A roof 80 is provided to an upper portion of the vehicle cabin R1. Further, in both of left and right side portions of the upper structure 3, front openings 3a and rear openings 3b are respectively formed. As illustrated in FIG. 1, the front opening 3a and the rear opening 3b are capable of being opened and closed by a front door 81 and a rear door 82, respectively. Note that a front door and a rear door are disposed on a right side of the upper structure 3 to be capable of being opened and closed.

The left and right side sills 74 and 75 are respectively disposed in both of left and right end portions of the floor panel 70 to extend in the front-rear direction. The left end portion of the floor panel 70 is connected with an intermediate portion of the left side sill 74 in the up-down direction, and the right end portion of the floor panel 70 is connected with an intermediate portion of the right side sill 75 in the up-down direction. Upper-side portions of the side sills 74 and 75 are protruded upward from connected sections with the floor panel 70, and lower-side portions of the side sills 74 and 75 are protruded downward from the connected sections with the floor panel 70. Because the battery casing 10 is arranged below the floor panel 70, the battery casing 10 is arranged between the left and right side sills 74 and 75, and in a vehicle side view, the lower-side portions of the side sills 74 and 75 overlap with the battery casing 10.

The dash panel 71 is a member which extends in the vehicle width direction and the up-down direction and is for partitioning the vehicle cabin R1 from the power chamber R3. A lower end portion of the dash panel 71 is connected with the front end portion of the floor panel 70.

Figure 7:
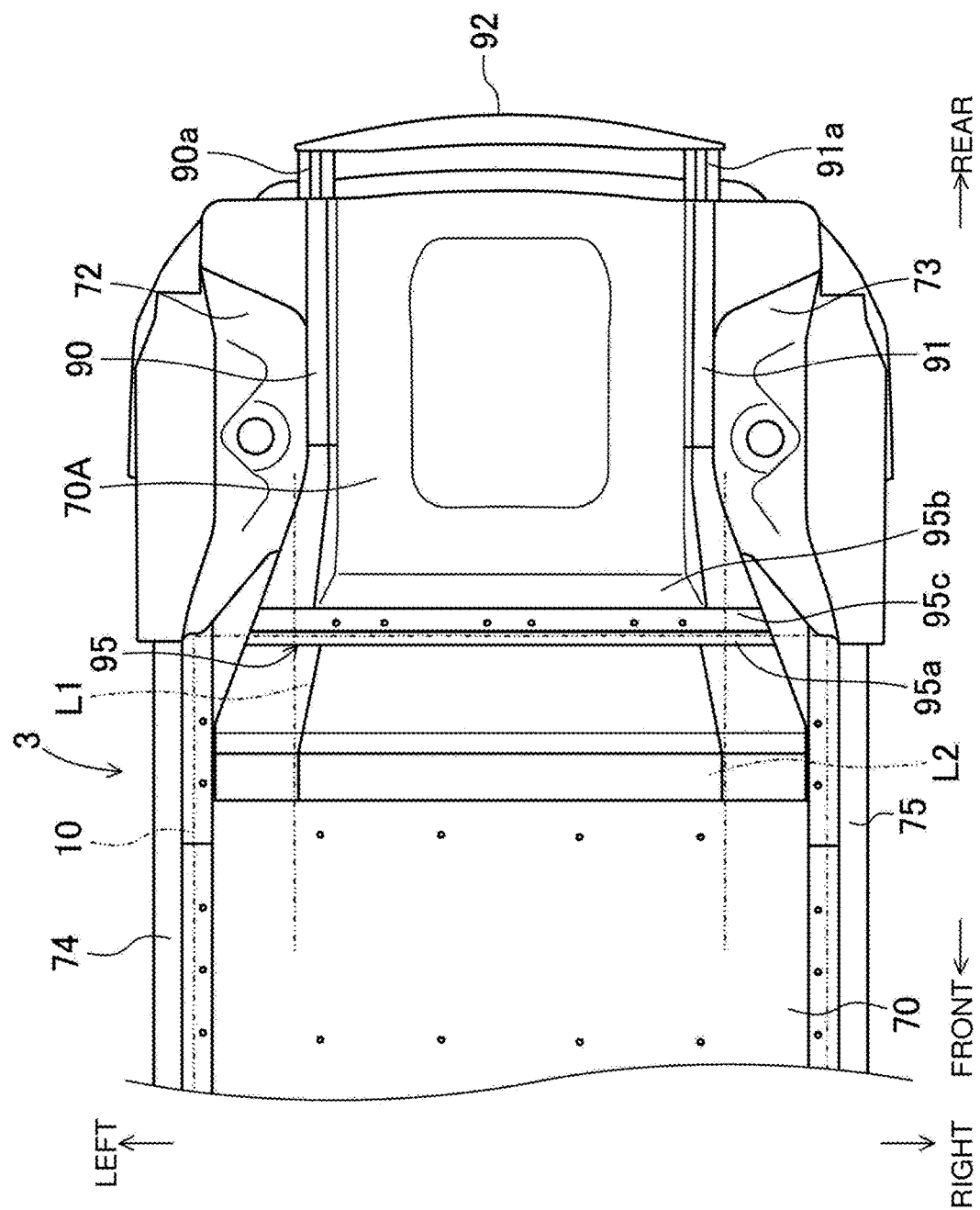
FIG. 7 is a bottom view of a rear-side portion of the upper structure.

FIG. 7 is a bottom view of a rear-side portion of the upper structure 3, and as illustrated in FIG. 7, the floor panel 70 of the upper structure 3 has a rear panel portion 70A which configures a floor surface of the trunk R2. On both of left and right sides of the rear panel portion 70A, left and right rear wheel wells 72 and 73 are respectively provided.

The upper structure 3 includes a pair of left and right rear side frames 90 and 91 which extend in the front-rear direction in the vehicle rear portion. The left rear side frame 90 is formed to extend along a left end portion of the rear panel portion 70A on the vehicle-width-direction inner side of the left rear wheel well 72. In a rear portion of the left rear side frame 90, a left crush can 90a is provided to be protruded to the rear of a rear portion of the rear panel portion 70A.

The right rear side frame 91 is formed to extend along a right end portion of the rear panel portion 70A on the vehicle-width-direction inner side of the right rear wheel well 73. In a rear portion of the right rear side frame 91, a right crush can 91a is provided to be protruded to the rear of the rear portion of the rear panel portion 70A. A bumper reinforcement 92 which extends in the left-right direction is mounted on the rear portion of the left crush can 90a and the rear portion of the right crush can 91a. Front-side portions of the left and right rear side frames 90 and 91 are formed to be bent or inclined downward.

Further, as illustrated in FIG. 4 and FIG. 8, the rear-side battery frame 33 of the battery casing 10 extends in the vehicle width direction in front of front portions of the rear side frames 90 and 91. More specifically, because the battery casing 10 is provided below the floor panel 70, the rear-side battery frame 33 is arranged below the front portions of the rear side frames 90 and 91.

The front portion of the left rear side frame 90 is spaced apart, by a prescribed distance, from a rear portion of the left side sill 74 to the rear and to the vehicle-width-direction inner side, and the front portion of the left rear side frame 90 is not connected with the rear portion of the left side sill 74. Further, similarly, the front portion of the right rear side frame 91 is spaced apart, by a prescribed distance, from a rear portion of the right side sill 75 to the rear and to the vehicle-width-direction inner side, and the front portion of the right rear side frame 91 is not connected with the rear portion of the right side sill 75. That is, hypothetically, when a case is presumed where the left rear side frame 90 is connected with the left side sill 74, the front portion of the rear side frame 90 is elongated forward and is thereby connected with the rear portion of the side sill 74. In such a case, the front portion of the rear side frame 90 is protruded to the vehicle-width-direction inner side of the rear wheel well 72. The same applies to the right side, and the front portion of the rear side frame 91 is protruded to the vehicle-width-direction inner side of the rear wheel well 73. When the left and right rear side frames 90 and 91 are protruded to the vehicle-width-direction inner sides, a dimension, in the left-right direction, of a rear side of the battery casing 10 has to be shortened, and further an installed amount of the batteries B is decreased.

In the present embodiment, by not connecting the rear side frames 90 and 91 respectively with the side sills 74 and 75, a space is formed in which the battery casing 10 is capable of being elongated rearward. Accordingly, because the battery casing 10 can be elongated rearward such that the rear side of the battery casing 10 becomes close to the rear wheel wells 72 and 73 and a long dimension, in the left-right direction, of the rear side of the battery casing 10 can be secured, the installed amount of the batteries B can be increased.

For example, as illustrated in FIG. 7, in a case where an imaginary straight line L1 is presumed which extends forward from a central portion, in the left-right direction, of the front portion of the left rear side frame 90 and an imaginary straight line L2 is presumed which extends forward from a central portion, in the left-right direction, of the front portion of the right rear side frame 91, the battery casing 10 (its external shape is indicated by imaginary lines) is provided from a region on the left side of the imaginary straight line L1 to a region on the right side of the imaginary straight line L2. Such a large battery casing 10 is formed, the batteries B are thereby installed through an area between vehicle-width-direction outer sides of the imaginary straight lines L1 and L2, and the installed amount of the batteries B can further be increased.

Further, in a vehicle side view, the battery casing 10 extends to the rear of the rear portions of the side sills 74 and 75. Thus, because the rear-side battery frame 33 is positioned in the rear of the rear portions of the side sills 74 and 75, the batteries B are capable of being installed to the rear of the rear portions of the side sills 74 and 75.

In addition, in a case of not connecting the rear side frames 90 and 91 respectively with the side sills 74 and 75 and where an impact load is exerted from the rear, a problem possibly occurs that there is no direct load transmission path from the rear side frames 90 and 91 to the side sills 74 and 75; however, in the present embodiment, even when no such load transmission path is present, the impact load from the rear is capable of being absorbed by using the battery casing 10.

That is, as illustrated in FIG. 8 to FIG. 10, the left and right rear side frames 90 and 91 are coupled with the rear-side battery frame 33 by the vehicle-body-side frame 40. Specifically, the upper structure 3 includes a rear-side cross member 95 as a vehicle body component which configures a part of the vehicle body, and the rear-side cross member 95 is arranged such that the front portions of the rear side frames 90 and 91 abut the rear-side cross member 95 from the rear and extends in the vehicle width direction. The rear-side cross member 95 includes a front plate portion 95a which is continuous from the vicinity of a front portion of the left wheel well 72 to the vicinity of a front portion of the right wheel well 73 and extends in the up-down direction and the left-right direction, a rear plate portion 95b which is arranged to be spaced apart rearward from the front plate portion 95a and extends in the up-down direction and the left-right direction, and a lower plate portion 95c which extends from a lower end portion of the front plate portion 95a to a lower end portion of the rear plate portion 95b. A dimension of the rear plate portion 95b in the up-down direction is set longer than a dimension of the front plate portion 95a in the up-down direction, and an upper end portion of the rear plate portion 95b is positioned above an upper end portion of the front plate portion 95a. Further, inclination angles of the front plate portion 95a and the rear plate portion 95b are set such that a distance between the front plate portion 95a and the rear plate portion 95b in the front-rear direction becomes wider toward a higher position.

The upper end portion of the front plate portion 95a and the upper end portion of the rear plate portion 95b are joined to a lower surface of the floor panel 70, and a closed cross-section is formed with the front plate portion 95a, the rear plate portion 95b, the lower plate portion 95c, and the floor panel 70. Accordingly, rigidity of the floor panel 70 can be enhanced.

The front portions of the rear side frames 90 and 91 abut the rear plate portion 95b of the rear-side cross member 95 from the rear and are joined to the rear plate portion 95b and the lower plate portion 95c. Because a dimension of the rear plate portion 95b in the up-down direction is long compared to the front plate portion 95a, a wide joining area of the rear side frames 90 and 91 with respect to the rear-side cross member 95 can be secured.

As illustrated in FIG. 8, the rear-side battery frame 33 is disposed below the rear-side cross member 95, and the lower plate portion 95c of the rear-side cross member 95 is formed to extend along an outer surface (upper surface) of the upper wall portion 33a of the rear-side battery frame 33. The rear-side cross member 95 and the rear-side battery frame 33 are fastened and fixed together in the up-down direction. Accordingly, the rear-side battery frame 33 is set to a state where that is mounted on the rear-side cross member 95 to be detachable.

Specifically, as illustrated in FIG. 9, a lower surface of a cylindrical nut N1 which extends in the up-down direction is fixed to an upper surface of the lower plate portion 95c of the rear-side cross member 95. Because the nut N1 is disposed in the rear-side cross member 95, an inner space of the rear-side cross member 95 can efficiently be used.

As illustrated in FIG. 10, plural nuts N1 are provided at distances from each other in the left-right direction. Plural reinforcement plates 95d corresponding to the number of nuts N1 are provided in an internal portion of the rear-side cross member 95. The reinforcement plate 95d has a through hole 95e through which an upper portion of the nut N1 passes. Because an outer peripheral surface of the nut N1 is welded to a peripheral edge portion of the through hole 95e in a state where the upper portion of the nut N1 passes through the through hole 95e, fixing strength of the nut N1 can be enhanced. A front-side portion of the reinforcement plate 95d is formed along an inner surface of the front plate portion 95a and is welded to the front plate portion 95a. A rear-side portion of the reinforcement plate 95d is formed along an inner surface of the rear plate portion 95b and is welded to the rear plate portion 95b. Consequently, a state is established where the front plate portion 95a and the rear plate portion 95b are coupled together by the reinforcement plate 95d.

In the first partition wall portion 33e of the rear-side battery frame 33, an insertion hole 33g is formed through which a bolt B1 is inserted from below. The same number of insertion holes 33g as the number of nuts N1 are provided and formed at the same distances as the distances among the nuts N1. The nut N1 is arranged directly above the insertion hole 33g. The bolt B1 inserted through the insertion hole 33g passes through the upper wall portion 33a of the rear-side battery frame 33 and is screwed into the nut N1 from below while passing through the lower plate portion 95c. Insertion holes through which the bolts B1 are inserted are formed in the upper wall portion 33a of the rear-side battery frame 33, and insertion holes through which the bolts B1 are inserted are also formed in the lower plate portion 95c of the rear-side cross member 95.

Hole portions 33h are formed in the lower wall portion 33d of the rear-side battery frame 33. The hole portion 33h is for allowing the bolt B1 to pass through and is formed to open in an outer surface (lower surface) of the lower wall portion 33d of the rear-side battery frame 33 and to be connected with a space in an internal portion of the rear-side battery frame 33. A shape of the hole portion 33h is a circular shape but is not limited to this. Further, a diameter of the hole portion 33h is set larger than a maximum outer diameter of a head portion of the bolt B1, and the bolt B1 is enabled to be easily inserted.

The same number of hole portions 33h as the number of nuts N1 are also provided and formed at the same distances as the distances among the nuts N1. In a state where shaft portions of the bolts B1 are directed upward, the bolts B1 are inserted into the space in the internal portion of the rear-side battery frame 33 through the hole portions 33h and are screwed into the respective nuts N1. Accordingly, the rear-side cross member 95 and the rear-side battery frame 33 can be fastened and fixed together at plural parts.

The head portion of the bolt B1 enters the internal portion of the rear-side battery frame 33 and abuts, from below, a peripheral edge portion of the insertion hole 33g in the first partition wall portion 33e.

Accordingly, because the head portion of the bolt B1 exerts a fixing force, upward from below, on the peripheral edge portion of the insertion hole 33g in the first partition wall portion 33e, the rear-side battery frame 33 can be fixed to the rear-side cross member 95 in the internal portion of the rear-side battery frame 33. In other words, the bolt B1 is a fixation member which is inserted into the space of the internal portion of the rear-side battery frame 33 through the hole portion 33h and is capable of fixing the rear-side battery frame 33 to the rear-side cross member 95 as another component than the vehicle-body-side frame 40 in the internal portion of the rear-side battery frame 33. Note that the fixation member is not limited to a bolt but may be a fastening member such as a screw or a rivet, for example.

The lower plate portion 40b of the vehicle-body-side frame 40 is formed to extend along the outer surface of the rear-side battery frame 33 in which the hole portions 33h are formed (the outer surface of the lower wall portion 33d). Consequently, the hole portions 33h can be covered from below by the lower plate portion 40b. In the present embodiment, the lower plate portion 40b serves as a cover portion which covers the hole portions 33h from the outside of the rear-side battery frame 33. The lower plate portion 40b extends to an area in front of front portions of the hole portions 33h and can thus completely cover the hole portions 33h.

(Fastening Structure of Vehicle-Body-Side Frame)

Next, a description will be made about a fastening structure of the vehicle-body-side frame 40 to the rear-side battery frame 33. As illustrated in FIG. 9, to an inner surface (upper surface) of the lower wall portion 33d of the rear-side battery frame 33, plural nuts N2 are fixed at distances from each other in the vehicle width direction. An axis line of the nut N2 extends in the up-down direction and is parallel with an axis line of the nut N1.

The lower plate portion 40b of the vehicle-body-side frame 40 is arranged on an outer surface (lower surface) of the lower wall portion 33d of the rear-side battery frame 33, and plural bolts B2 which are screwed into the nuts N2 pass through, from below, the lower wall portion 33d of the rear-side battery frame 33 and the lower plate portion 40b of the vehicle-body-side frame 40. The bolt B2, which passes through, from below, the lower wall portion 33d of the rear-side battery frame 33 and the lower plate portion 40b of the vehicle-body-side frame 40, is screwed into the nut N2 from below. The bolts B2 are respectively screwed into the nuts N2, and the vehicle-body-side frame 40 and the rear-side battery frame 33 can thereby be fastened together at plural parts.

Further, plural nuts N3 are fixed to an inner surface (front surface) of the rear wall portion 33c of the rear-side battery frame 33. An axis line of the nut N3 extends in the front-rear direction and is orthogonal to the axis lines of the nut N1 and nut N2 in a side view. The plural nuts N3 are provided at distances from each other in the vehicle width direction and are respectively provided to the upper-side portion and also to the lower-side portion of the rear wall portion 33c of the rear-side battery frame 33. The vertical plate portion 40a of the vehicle-body-side frame 40 is arranged on an outer surface (rear surface) of the rear wall portion 33c of the rear-side battery frame 33, and plural bolts B3 which are screwed into the nuts N3 pass through the rear wall portion 33c of the rear-side battery frame 33 and the vertical plate portion 40a of the vehicle-body-side frame 40. The bolt B3, which passes through, from below, the rear wall portion 33c of the rear-side battery frame 33 and the vertical plate portion 40a of the vehicle-body-side frame 40, is screwed into the nut N3 from the rear. The bolts B3 are respectively screwed into the nuts N3, and the vehicle-body-side frame 40 and the rear-side battery frame 33 can thereby be fastened together at plural parts.

(Working Effects of Embodiment)

As described above, in the present embodiment, the rear-side battery frame 33 which protects the batteries B has a hollow cross-section and thus becomes a member which is highly rigid and light. Further, because the vehicle-body-side frame 40 which extends along the rear-side battery frame 33 is coupled with the rear-side battery frame 33 at plural parts, this also enhances rigidity of the rear-side battery frame 33.

Furthermore, because the rear-side battery frame 33 is, in its internal portion, fixed to the rear-side cross member 95 by the bolts B1 separately from the vehicle-body-side frame 40, compared to a case where the rear-side battery frame 33 is fixed to the rear-side cross member 95 in a lower portion of the rear-side battery frame 33, the distance between a portion (first partition wall portion 33e) on which fixing forces of the bolts B1 are exerted in the rear-side battery frame 33 and the rear-side cross member 95 becomes short. Accordingly, mounting rigidity of the rear-side battery frame 33 on the vehicle body is enhanced.

Further, the hole portions 33h for inserting the bolts B1 are formed in the rear-side battery frame 33, but the hole portions 33h can be covered by the lower plate portion 40b of the vehicle-body-side frame 40 from the outside. Accordingly, entrance of foreign objects into the internal portion of the rear-side battery frame 33 can be inhibited. Further, because the hole portions 33h open in a lower surface of the vehicle body, this might lead to lowering of aerodynamic performance in traveling in a state where the hole portions 33h are not covered; however, in the present embodiment, because the hole portions 33h are covered by the lower plate portion 40b, lowering of aerodynamic performance in traveling can be avoided.

The above-described embodiment is merely an example in all respects and is not to be construed in a limited manner. Furthermore, all modifications and changes belonging to the equivalent scope of the claims are included in the scope of the present disclosure.

[Industrial Applicability]

As described in the foregoing, a vehicle-body structure according to the present disclosure can be provided to an electric vehicle, for example.

The invention claimed is:

1. A vehicle-body structure for an electric vehicle which includes a traveling motor and in which a battery supplying electric power to the traveling motor is disposed below a floor panel, the vehicle-body structure comprising:
  a battery protection frame that protects the battery and has a hollow cross-section;
  a vehicle-body-side frame that extends toward the battery protection frame and is coupled with the battery protection frame; and a fixation member that is inserted into a space of an internal portion of the battery protection frame through a hole portion opening in an outer surface of the battery protection frame and connected with the space, wherein the fixation member fixes the battery protection frame to a vehicle body component as another component than the vehicle-body-side frame in the internal portion of the battery protection frame, wherein the battery protection frame is disposed below the vehicle body component, wherein in the internal portion of the battery protection frame, a partition wall portion that marks off the space in an up-down direction is provided between an upper wall portion and a lower wall portion of the battery protection frame, and wherein the fixation member exerts a fixing force on the partition wall portion.

2. The vehicle-body structure according to claim 1, wherein
the vehicle-body-side frame is provided with a cover portion that is formed to extend along the outer surface, in which the hole portion is formed, in the battery protection frame and that covers the hole portion from an outside of the battery protection frame.

3. The vehicle-body structure according to claim 1, wherein
the vehicle-body-side frame includes a suspension connecting portion with which at least a part of a suspension apparatus is coupled.

4. The vehicle-body structure according to claim 3, wherein
the battery protection frame extends in a vehicle width direction, and
the vehicle-body-side frame includes a lower plate portion that extends in the vehicle width direction along a lower wall portion of the battery protection frame and is fixed to the lower wall portion and a vertical plate portion that extends in the vehicle width direction along one wall portion of the battery protection frame in a vehicle front-rear direction and is fixed to the one wall portion.

5. The vehicle-body structure according to claim 4, wherein
the hole portion is formed in the lower wall portion of the battery protection frame, and
the hole portion is covered from below by the lower plate portion of the vehicle-body-side frame.

6. The vehicle-body structure according to claim 1, wherein
the battery protection frame extends in a vehicle width direction, and
the vehicle-body-side frame includes a lower plate portion that extends in the vehicle width direction along a lower wall portion of the battery protection frame and is fixed to the lower wall portion and a vertical plate portion that extends in the vehicle width direction along one wall portion of the battery protection frame in a vehicle front-rear direction and is fixed to the one wall portion.

7. The vehicle-body structure according to claim 2, wherein
the vehicle-body-side frame includes a suspension connecting portion with which at least a part of a suspension apparatus is coupled.

8. The vehicle-body structure according to claim 2, wherein
the battery protection frame extends in a vehicle width direction, and
the vehicle-body-side frame includes a lower plate portion that extends in the vehicle width direction along a lower wall portion of the battery protection frame and is fixed to the lower wall portion and a vertical plate portion that extends in the vehicle width direction along one wall portion of the battery protection frame in a vehicle front-rear direction and is fixed to the one wall portion.

* * * * *